(12) United States Patent
Kuboyama et al.

(10) Patent No.: US 8,069,041 B2
(45) Date of Patent: Nov. 29, 2011

(54) DISPLAY OF CHANNEL CANDIDATES FROM VOICE RECOGNITION RESULTS FOR A PLURALITY OF RECEIVING UNITS

(75) Inventors: Hideo Kuboyama, Yokohama (JP); Masayuki Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1438 days.

(21) Appl. No.: 11/549,423

(22) Filed: Oct. 13, 2006

(65) Prior Publication Data
US 2007/0118382 A1  May 24, 2007

(30) Foreign Application Priority Data
Nov. 18, 2005  (JP) .................................. 2005-334319

(51) Int. Cl.
*G10L 15/22* (2006.01)
*H04N 5/45* (2011.01)
(52) U.S. Cl. ........... 704/236; 704/275; 348/565; 725/59
(58) Field of Classification Search .................. 704/235, 704/236, 240, 246, 251, 270, 275; 348/564, 348/565, 734; 455/161.2, 191.1; 725/43, 725/44, 48, 59
See application file for complete search history.

(56) References Cited

U.S. PATENT DOCUMENTS

| | | | | |
|---|---|---|---|---|
| 5,900,916 A | * | 5/1999 | Pauley | 725/59 |
| 6,005,597 A | * | 12/1999 | Barrett et al. | 725/46 |
| 6,553,345 B1 | * | 4/2003 | Kuhn et al. | 704/275 |
| 6,925,289 B2 | * | 8/2005 | Fukushima | 455/161.2 |
| 7,373,650 B1 | * | 5/2008 | Rodriguez et al. | 725/41 |
| 7,426,467 B2 | * | 9/2008 | Nashida et al. | 704/275 |
| 7,493,646 B2 | * | 2/2009 | Ellis | 725/87 |
| 7,594,243 B2 | * | 9/2009 | Yuen et al. | 725/43 |
| 7,594,244 B2 | * | 9/2009 | Scholl et al. | 725/46 |
| 2001/0012998 A1 | * | 8/2001 | Jouet et al. | 704/248 |
| 2001/0020297 A1 | * | 9/2001 | Inoue | 725/39 |
| 2002/0057372 A1 | * | 5/2002 | Cavallerano et al. | 348/565 |
| 2003/0078784 A1 | * | 4/2003 | Jordan et al. | 704/275 |
| 2003/0103060 A1 | * | 6/2003 | Anderson et al. | 345/619 |
| 2003/0125948 A1 | * | 7/2003 | Lyudovyk | 704/257 |
| 2004/0019908 A1 | * | 1/2004 | Williams et al. | 725/46 |
| 2004/0034866 A1 | * | 2/2004 | Yuen et al. | 725/40 |
| 2004/0176061 A1 | * | 9/2004 | Zehnle et al. | 455/191.1 |
| 2004/0186728 A1 | * | 9/2004 | Kuboyama et al. | 704/276 |
| 2005/0273838 A1 | * | 12/2005 | Witheiler | 725/126 |
| 2005/0288929 A1 | * | 12/2005 | Kuboyama et al. | 704/251 |
| 2006/0176398 A1 | * | 8/2006 | Kang | 348/564 |
| 2006/0221238 A1 | * | 10/2006 | Takayama | 348/565 |
| 2007/0011133 A1 | * | 1/2007 | Chang | 707/1 |
| 2009/0147140 A1 | * | 6/2009 | Kim | 348/565 |

FOREIGN PATENT DOCUMENTS

| | | |
|---|---|---|
| JP | 2000-250591 A | 9/2000 |
| JP | 2001-022374 A | 1/2001 |

\* cited by examiner

*Primary Examiner* — Martin Lerner
(74) *Attorney, Agent, or Firm* — Canon USA Inc. IP Division

(57) ABSTRACT

Candidates for channels of television programs to be displayed are determined in accordance with a result of voice recognition of a voice input by a user. The channel candidates are assigned to a limited number of tuners and television programs received by the tuners are displayed to allow the user to make a selection.

12 Claims, 8 Drawing Sheets

FIG. 6

| VOICE RECOGNITION SCORE | CHANNEL |
|---|---|
| HIGHEST | 34 |
| SECOND HIGHEST | 33 |
| THIRD HIGHEST | 44 |
| FOURTH HIGHEST | 74 |

(A) WHEN VOICE RECOGNITION RESULT HAS HIGH LIKELIHOOD SCORE

CHANNEL CANDIDATE: 34

TUNER #1: 34 ...

TUNER #2: (NO CHANNEL ASSIGNED) ...

TIME →

(B) WHEN VOICE RECOGNITION RESULT HAS LOW LIKELIHOOD SCORE

CHANNEL CANDIDATES: 34, 33, 44, 74

TUNER #1: 34 ...

TUNER #2: 33 | 44 | 74 | 33 | 44 | 74 | 33 | 44 ...

TIME →

DISPLAY OF CHANNEL CANDIDATES FROM VOICE RECOGNITION RESULTS FOR A PLURALITY OF RECEIVING UNITS

BACKGROUND OF THE INVENTION

1. Field of the Invention

The present invention relates to an information processing apparatus and an information processing method of selecting program information by use of voice recognition.

2. Description of the Related Art

In recent years, the number of television channels has greatly increased. As a result, it has become troublesome to select a television program by pressing a button on a remote control unit. A proposed method to solve the above problem is to select a television program according to a voice selection command uttered by a user by using voice recognition. However, the voice recognition has a problem that there is a non-negligible probability that a recognition result is incorrect. If a voice selection command is incorrectly recognized, a wrong television program will be selected. This greatly deteriorates usability. In an attempt to control of a device by using voice recognition and to avoid the above problem, it has been proposed to present a defined number of candidates having high likelihood as the result of voice recognition whereby a user is allowed to select a desired channel from the presented candidates (see, for example, Japanese Patent Laid-Open No. 2001-022374). For example, as shown in FIG. 8, candidates derived from a voice recognition result are displayed in the form of a list. If a user selects a desired channel from the voice recognition result list with a GUI such as a cursor or the like, a television program is switched in accordance with the selection made by the user.

However, television programs are broadcast in real time in the form of stream information from television stations, and users want to view a desired program as quickly as possible. In the technique using voice recognition, selecting of a correct television channel from a list of candidates for the correct channel may require a relatively long time for a user to select and view a desired program, which can cause the user to miss important information.

In the technique of searching for still images by using voice recognition, it has been proposed to select candidates for a correct still image and display all selected candidates in the form of images instead of displaying a list. By analogy, in selection of a television program by using voice recognition, it may be advantageous to select candidates for a correct program and display all candidates in the form of thumbnail images or the like so that a user is allowed to select a desired program from the displayed thumbnail images. If the user selects a program, the selected program is displayed in a full screen mode. However, the limit on the number of tuners installed on a television set makes it difficult to display all candidates at the same time.

SUMMARY OF THE INVENTION

In view of the above, at least one embodiment of the present invention provides a technique to select a plurality of candidates of television channels in accordance with a result of voice recognition and assign the selected channels to a limited number of tuners thereby presenting television images of the selected channels to a user.

According to an aspect of the present invention, at least one embodiment is directed to an information processing apparatus including a plurality of receiving units configured to receive program information, a voice recognition unit configured to recognize input voice data, an acquisition unit configured to acquire one or more channel candidates in accordance with a result of voice recognition performed by the voice recognition unit, an assigning unit configured to assign the channel candidates acquired by the acquisition unit to the respective receiving unit, and a display control unit configured to control displaying so that program information corresponding to the assigned channels received by the respective receiving unit is displayed.

According to another aspect of the present invention, at least one embodiment is directed to an information processing apparatus including a receiving unit configured to receive program information, a voice recognition unit configured to recognize input voice data, an acquisition unit configured to acquire one or more channel candidates in accordance with a result of voice recognition performed by the voice recognition unit, an assigning unit configured to assign the channel candidates acquired by the acquisition unit to the receiving unit such that one channel candidate is assigned at a time to the receiving unit and the assigned channel candidate is switched at predetermined time intervals, and a display control unit configured to control displaying so that program information received by the receiving unit in accordance with the assigned channel is displayed.

According to another aspect of the present invention, at least one embodiment is directed to an information processing apparatus including a voice recognition unit configured to recognize input voice data, a candidate determination unit configured to determine one or more candidates for video information in accordance with a result of voice recognition performed by the voice recognition unit, an output mode determination unit configured to determine an output mode for each video information candidate by selecting one output mode from a group including a first output mode in which video information is directly output, a second output mode in which video information is acquired at predetermined time intervals and resultant acquired video information is output, and a third output mode in which video information is acquired at a particular time and resultant acquired video information is output, and a display control unit configured to control displaying such that a display area is divided into subareas and video information of the video information candidates is displayed in the subareas in the output modes determined for the respective video information candidates.

According to another aspect of the present invention, at least one embodiment is directed to a method including performing voice recognition to recognize input voice data, selecting one or more channel candidates in accordance with a result of voice recognition performed, assigning the channel candidates selected to a plurality of respective receiving units, and controlling displaying such that information received by the receiving units is displayed.

According to another aspect of the present invention, at least one embodiment is directed to a method including performing voice recognition to recognize input voice data, acquiring one or more channel candidates in accordance with a result of voice recognition performed, receiving program information corresponding to the channel candidates acquired such that program information of one channel candidate is received at a time and the received program information is switched at predetermined time intervals, and controlling displaying so that program information received is displayed.

According to another aspect of the present invention, at least one embodiment is directed to a method of outputting video information including performing voice recognition to recognize input voice data, determining one or more candidates for video information in accordance with a result of voice recognition performed, determining an output mode for each video information candidate by selecting one output mode from a group including a first output mode in which video information is directly output, a second output mode in which video information is acquired at predetermined time intervals and resultant acquired video information is output, and a third output mode in which video information is acquired at a particular time and resultant acquired video information is output, and controlling displaying such that a display area is divided into subareas and video information of the video information candidates is displayed in the subareas in the output modes determined for the respective video information candidates.

Further features of the present invention will become apparent from the following description of exemplary embodiments with reference to the attached drawings.

BRIEF DESCRIPTION OF THE DRAWINGS

FIG. 6 shows an example of a manner in which tuners are assigned in accordance with an embodiment of the present invention.

DESCRIPTION OF THE EMBODIMENTS

The present invention is described in further detail below with reference to exemplary embodiments in conjunction with the accompanying drawings.

First Exemplary Embodiment

Figure 1:
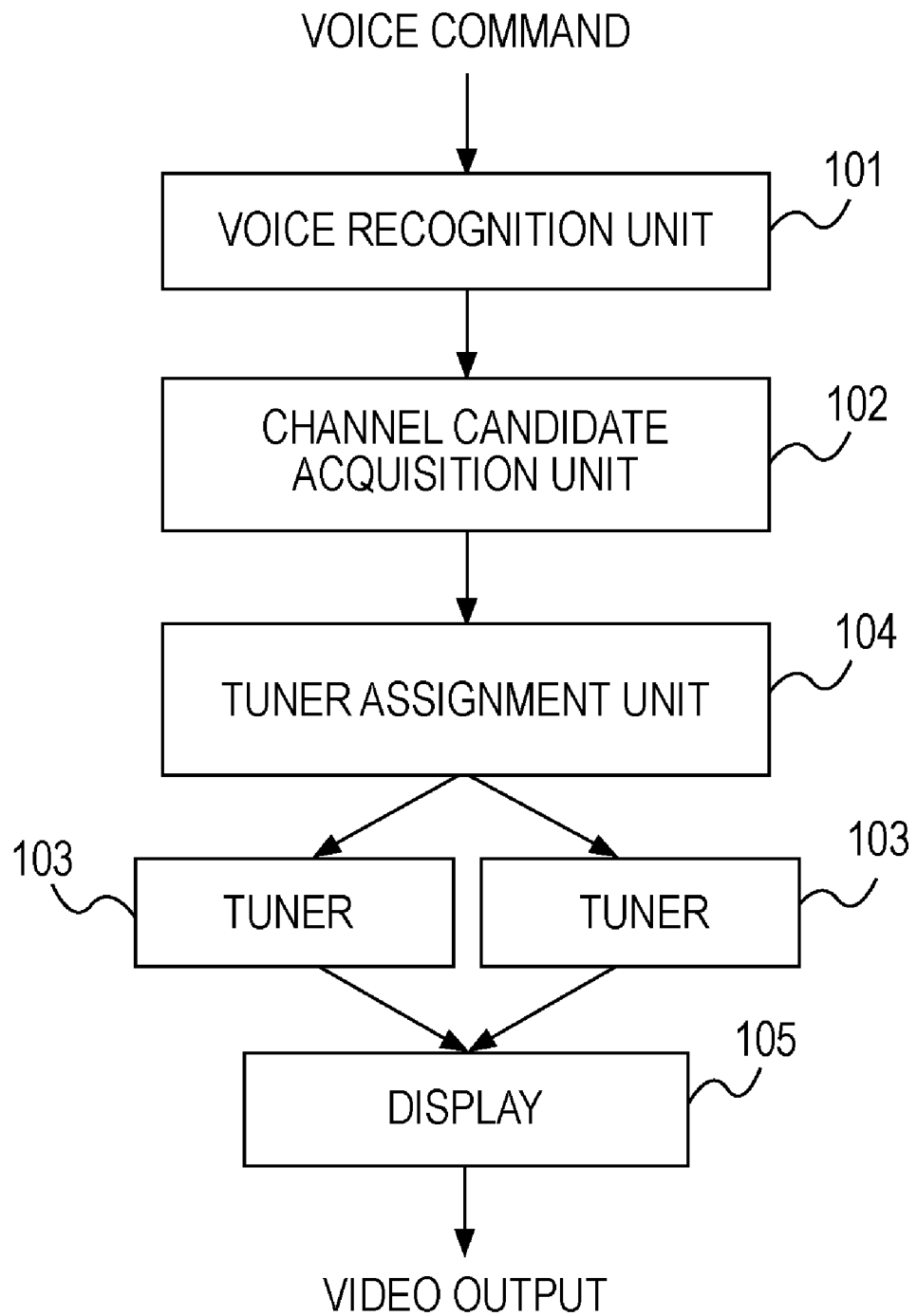
FIG. 1 is a block diagram showing a functional configuration of an information processing apparatus according to an embodiment of the present invention.

FIG. 1 is a block diagram showing a functional configuration of an information processing apparatus according to a first embodiment of the present invention. As shown in FIG. 1, the information processing apparatus includes a voice recognition unit 101 adapted to recognize a voice uttered by a user, a channel candidate acquisition unit 102 adapted to acquire channel candidates on the basis of a result of voice recognition performed by the voice recognition unit 101, and tuners 103 adapted to receive television programs of assigned channels. Note that the information processing apparatus includes a predetermined number (one or more) of tuners 103. A tuner assignment unit 104 assigns one or more channels, acquired as channel candidates by the channel candidate acquisition unit 102, to the tuners 103. A display 105 displays program information corresponding to the channels received by the tuners 103.

Figure 2:
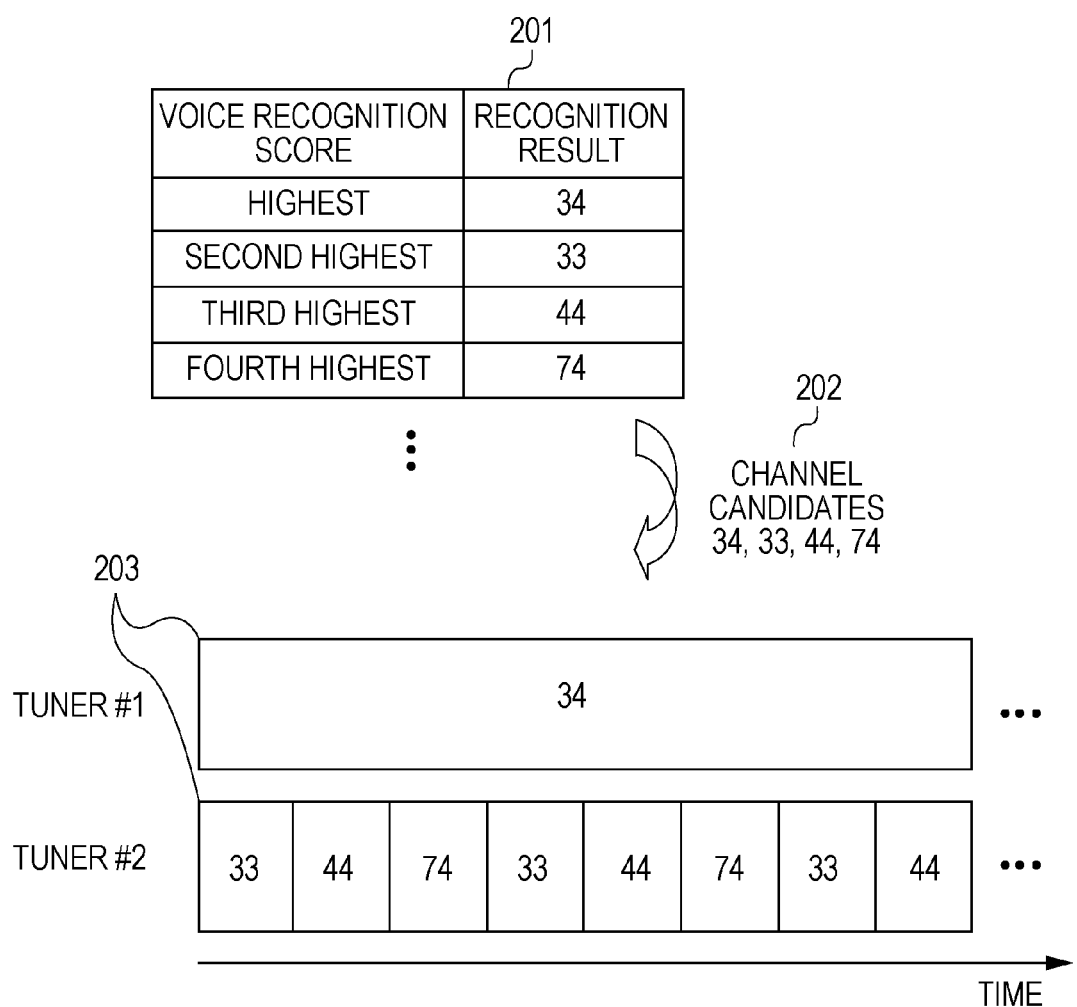
FIG. 2 is a diagram showing a manner in which tuners are assigned in accordance with an embodiment of the present invention.

FIG. 2 shows a manner in which channels are assigned to the tuners. In FIG. 2, a result of recognition performed by the voice recognition unit 101 for a voice uttered by a user is shown in the form a table 201. According to the result of the voice recognition, channel candidates 202 are obtained. The channels selected as the candidates 202 are assigned to the predetermined number of tuners as shown in a time table 203. In the present embodiment, it is assumed by way of example that the information processing apparatus has two tuners.

Referring to FIGS. 1 and 2, an example of the operation of the information processing apparatus according to the present embodiment is described below. First, a user says a desired channel to the voice recognition unit 101. Herein, the channel may be specified by a channel number or a station name. Table 201 in FIG. 2 shows an example of a result of voice recognition for a case in which a channel number spoken by a user is recognized. On the basis of the result of the voice recognition, the channel candidate acquisition unit 102 acquires 1st to N-th most likely channel candidates. In the specific example shown in FIG. 2, 1st to 4th most likelihood channel candidates are obtained. The tuner assignment unit 104 assigns these four channels obtained as candidates to the two tuners 103. In this specific example, "34" is obtained as the most likely channel in the voice recognition, and thus the tuner #1 is assigned channel "34" exclusively. The 2nd to 4th most likely channels are assigned to the tuner #2 such that the channels are switched at equal time intervals.

As shown in time table 203 in FIG. 2, the television program of channel "34" with the highest likelihood (confidence) score exclusively uses the tuner #1 so that complete program information is received. On the other hand, television programs of channels with the 2nd to 4th highest likelihood scores are received such that one channel is received at a time by the tuner #2, and the channel is sequentially switched. Thus, program information of each channel is received intermittently only in particular time periods during which the channel is assigned to the tuner #2. Because the channel with the highest likelihood score is continuously received, a smooth video image is obtained for this channel. In contrast, because the channels with the 2nd to 4th highest likelihood scores are received intermittently, rough-motion video images are obtained.

Figure 3A:
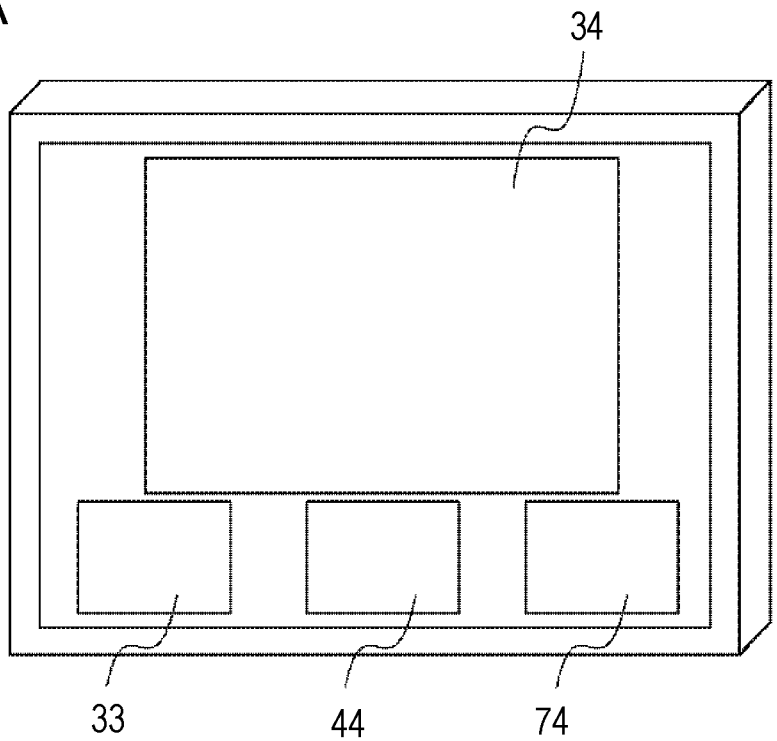
FIGS. 3A and 3B show examples of manners in which channels selected as candidates are displayed in subareas of a display screen according to an embodiment of the present invention.
Figure 3B:
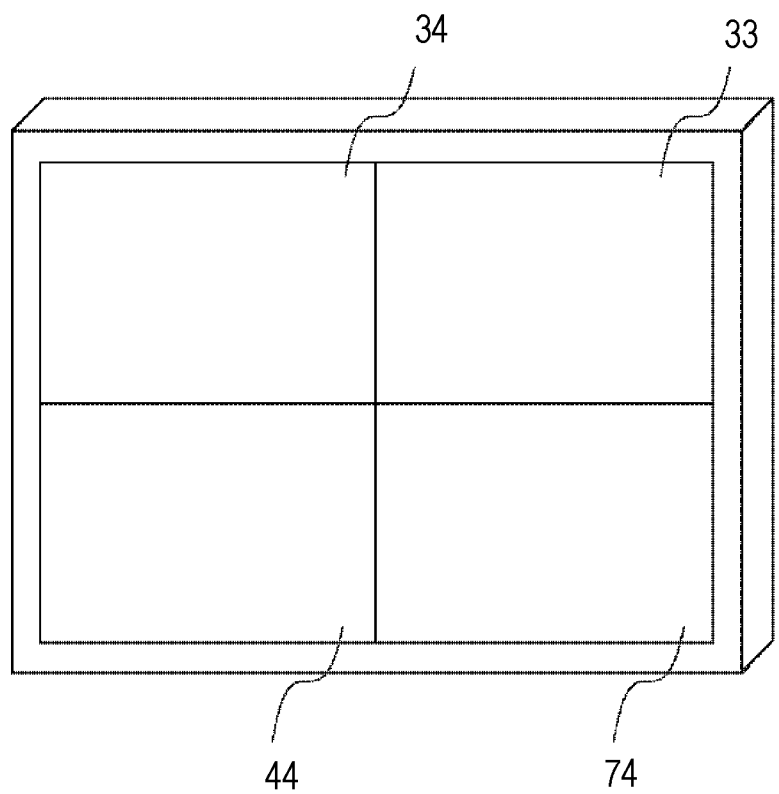

FIGS. 3A and 3B show examples of manners in which program information of channels with 1st to 4th likelihood scores is displayed in subareas of a display screen of the display 105. In the example shown in FIG. 3A, the program information of the channel with the highest likelihood score is displayed in a largest subarea, and the program information of the other channels is displayed in smaller subareas. In the example shown in FIG. 3B, the program information of the respective channels is displayed in subareas with the same size. In the present invention, there is no particular restriction on the manner in which program information is displayed. The screen may be divided into subareas in an arbitrary manner, and channels may be assigned to subareas in an arbitrary manner.

In the present embodiment, as described above, a plurality of channels selected as candidates on the basis of the result of voice recognition are assigned to the limited number of tuners such that respective channels are received in particular assigned time periods and displayed in subareas of the screen. This makes it possible for a user to quickly select a channel, and thus the probability of missing program information is minimized. If the user selects a desired channel from the candidates being displayed in the subareas, the selected channel is displayed in the full screen mode.

Second Exemplary Embodiment

In the first embodiment described above, it is assumed that the information processing apparatus has two tuners. However, in the present invention, there is no particular restriction on the number of tuners. A greater number of tuners may be used, or alternatively, only one tuner may be used. In the first embodiment described above, a channel with the highest likelihood score is allowed to exclusively use one tuner, and channels with 2nd to 4th highest likelihood scores are allowed to use one tuner in a time sharing fashion. However, in the present invention, there is no particular restriction on the manner in which channels are assigned to tuners. For example, a channel with the highest likelihood score may not be exclusively assigned to one tuner, but all channels with 1st to N-th highest likelihood scores may be equally dealt with such that time periods are equally assigned. Alternatively, the length of the assigned time period may be varied depending on the likelihood scores. A tuner may be assigned to a particular channel only in a short period, and a video image acquired in this period may be displayed in the form of a still image.

Figure 4:
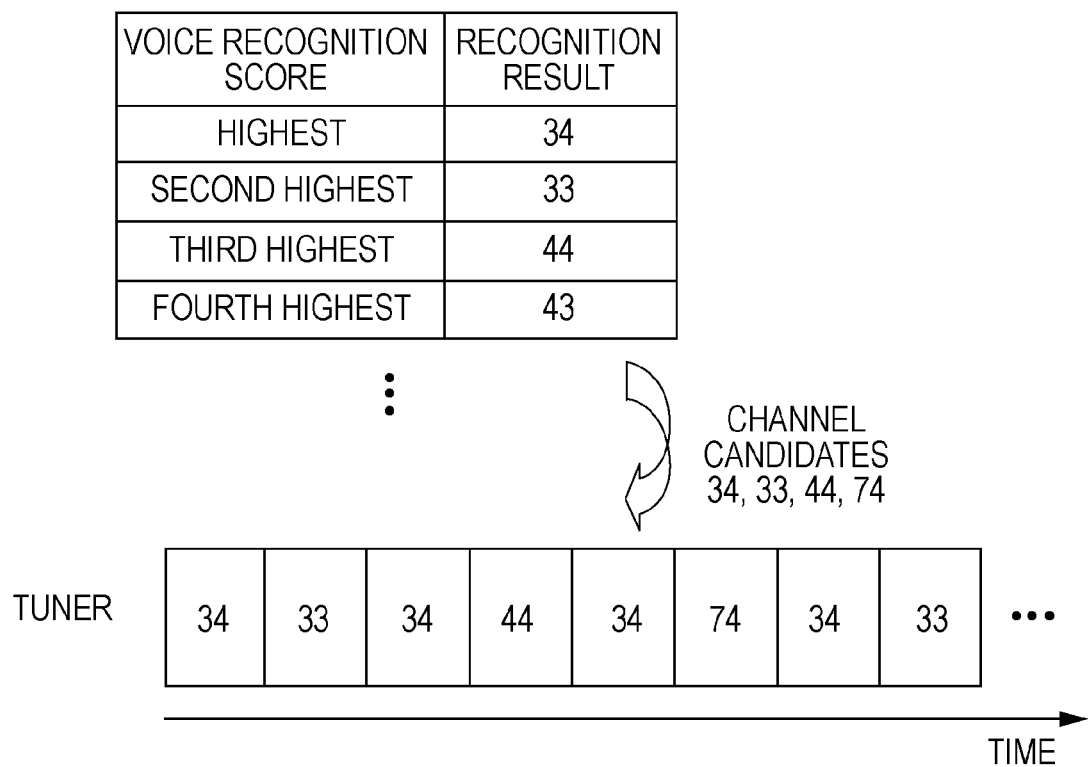
FIG. 4 is a diagram showing a manner in which tuners are assigned in accordance with an embodiment of the present invention.

FIG. 4 shows an example in which channels with 1st to 4th highest likelihood scores are assigned to one tuner. In this case, any channel of those with 1st to 4th highest likelihood scores is received intermittently, and thus a video image of any channel has rough motion. However, the channel with the highest likelihood score is assigned to the tuner more frequently than the other channels, the video image of this channel is relatively smoother in motion than the other channels.

Third Exemplary Embodiment

In the previous embodiments described above, program information of channels selected as candidates is received using one or more tuners and displayed at the same time in subareas of the screen of the display 105. However, in the present invention, the manner of displaying received program information is not limited to this. For example, one of the channels selected as candidates may be displayed at a time in the full screen mode, and the displayed channel may be automatically or manually switched.

Fourth Exemplary Embodiment

In the previous embodiments described above, a channel number is recognized and channel candidates are determined on the basis of a result of recognition. However, in an embodiment of the present invention, channel candidates may be determined on the basis of other information such as a station name. The channel candidates may also be determined on the basis of program related information described in, for example, an EPG (Electronic Program Guide), such as a program name, a performer, a keyword, or a category.

Figure 5:
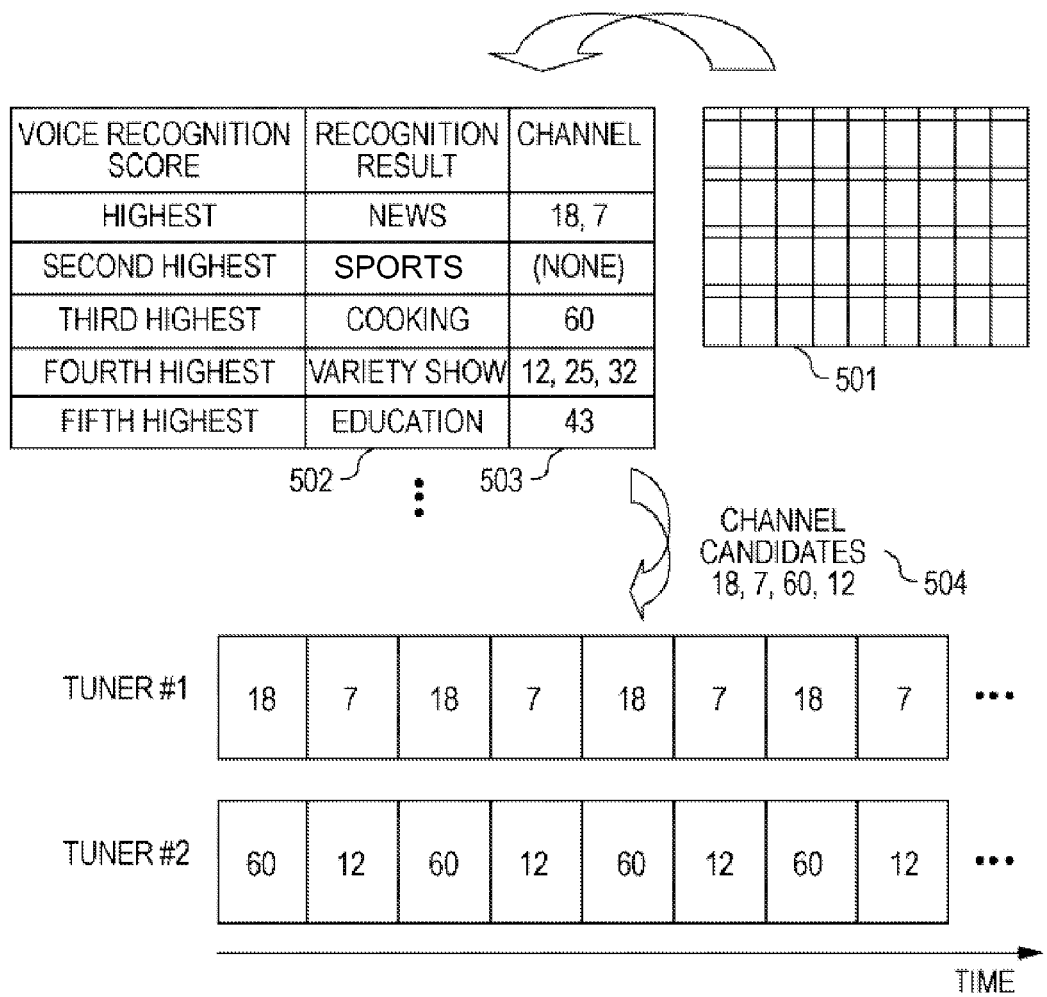
FIG. 5 shows an example of a manner in which tuners are assigned in accordance with an embodiment of the present invention.

FIG. 5 shows an embodiment in which a program category is recognized, channel candidates are determined on the basis of a result of recognition, and the channel candidates are assigned to tuners. In FIG. 5, reference numeral 501 denotes program related information such as an EPG according to which channel candidates are determined. Reference numeral 502 denotes a result of recognition performed by the voice recognition unit 101. In this specific example, recognition is performed in terms of a program category described in the program related information 501. Reference numeral 503 denotes channels on which programs of recognized program categories are currently broadcast. Reference numeral 504 denotes channel candidates determined by the channel candidate acquisition unit 102 from the channels 503.

More specifically, an embodiment is configured to recognize a program category spoken by a user such as "news", "sports", or "economy". The voice recognition unit 101 recognizes the program category spoken by the user, and outputs a result of recognition 502 indicating suggested categories with high likelihood scores obtained in the recognition. The channel candidate acquisition unit 102 searches the program related information 501 for programs that belong to one of the suggested categories 502 and that are currently broadcast. The channel candidate acquisition unit 102 then determines channels 503 corresponding to the programs found in the searching process and determines channel candidates 504 from these channels 503. The channel candidates 504 may be determined according to criteria such as likelihood scores given in recognition, the number of channels displayable on the display 105, and/or a predetermined maximum number of candidates. In the example shown in FIG. 5, it is assumed that the display 105 is capable of displaying up to four channels, and channels are selected from those corresponding to categories with highest recognition likelihood scores. In this specific example, three channels are selected from those corresponding to categories with 1st to 3rd highest recognition likelihood scores. However, category "variety show" with the 4th highest scores includes three detected channels, and thus arbitrary one of these three detected channels is selected. The channel candidates determined in the above-described manner are assigned to a predetermined number of tuners at predetermined time intervals. In the example shown in FIG. 5, the four channel candidates are assigned to two tuners at equal time intervals.

In the present embodiment, as described above, channel candidates are determined on the basis of a result of voice recognition in terms of a category, a keyword, a program name, or a performer, the determined channel candidates are assigned to the tuners, and programs received by the tuners are displayed so as to allow a user to select.

Fifth Exemplary Embodiment

In the previous embodiments described above, the channel candidate acquisition unit 102 acquires channel candidates from the result of voice recognition. When channel candidates are determined, the number of channel candidates may be varied depending on recognition confidence scores. The score indicating the confidence of voice recognition may be determined by the voice recognition unit 101 by using a proper method. For example, the score may be given by the difference between the highest likelihood and the second highest likelihood. Note that in the present invention, there is no particular restriction on the method of calculating the score. FIG. 6 shows an example in which the number of channel candidates assigned to the tuners is varied depending on the recognition confidence scores. When there is a channel candidate having a confidence score higher than a predetermined value ((A) in FIG. 6), it is determined that the recognition result is highly reliable, and only one channel "34" with the highest likelihood score is selected as a channel candidate. The tuner assignment unit assigns this only one channel candidate "34" to a tuner such that only this channel is received and displayed on the display to present it to a user. On the other hand, when recognition confidence scores are lower than the predetermined value ((B) in FIG. 6), it is determined that the recognition result is not sufficiently reliable, and channel candidates are assigned to tuners in a similar manner to the first embodiment described above. That is, channels with 1st to N-th (4th in the example shown in FIG. 6) highest likelihood scores are selected as channel candidates, and the tuner assignment unit assigns these channel candidates to the tuners. Video images received by the tuners are displayed on the display to present them to a user.

Sixth Exemplary Embodiment

In the embodiments described above, channel candidates are assigned to a limited number of tuners and programs received by the tuners are displayed in modes automatically determined depending on the manner in which channel candidates are assigned to the tuners. That is, depending on the manner in which channel candidates are assigned to the tuners, the received television programs are displayed such that complete frames are displayed, programs are displayed while skipping frames, or a still image is displayed. In the present embodiment, instead of automatically determining the mode in which to display received video information, the video information display mode is definitively determined by selecting a mode from a group including a mode in which complete video information is displayed, a mode in which video information acquired at particular time intervals is displayed, and a mode in which video information is displayed in the form of a still image. A plurality of pieces of video information are displayed in subareas of a screen. The present embodiment is useful in particular when a plurality of video images are displayed at the same time immediately in response to a voice command spoken by a user. Note that the present embodiment may be applied not only to an apparatus adapted to receive television programs using tuners but also to other apparatus adapted to display a plurality of video images at the same time.

Figure 7:
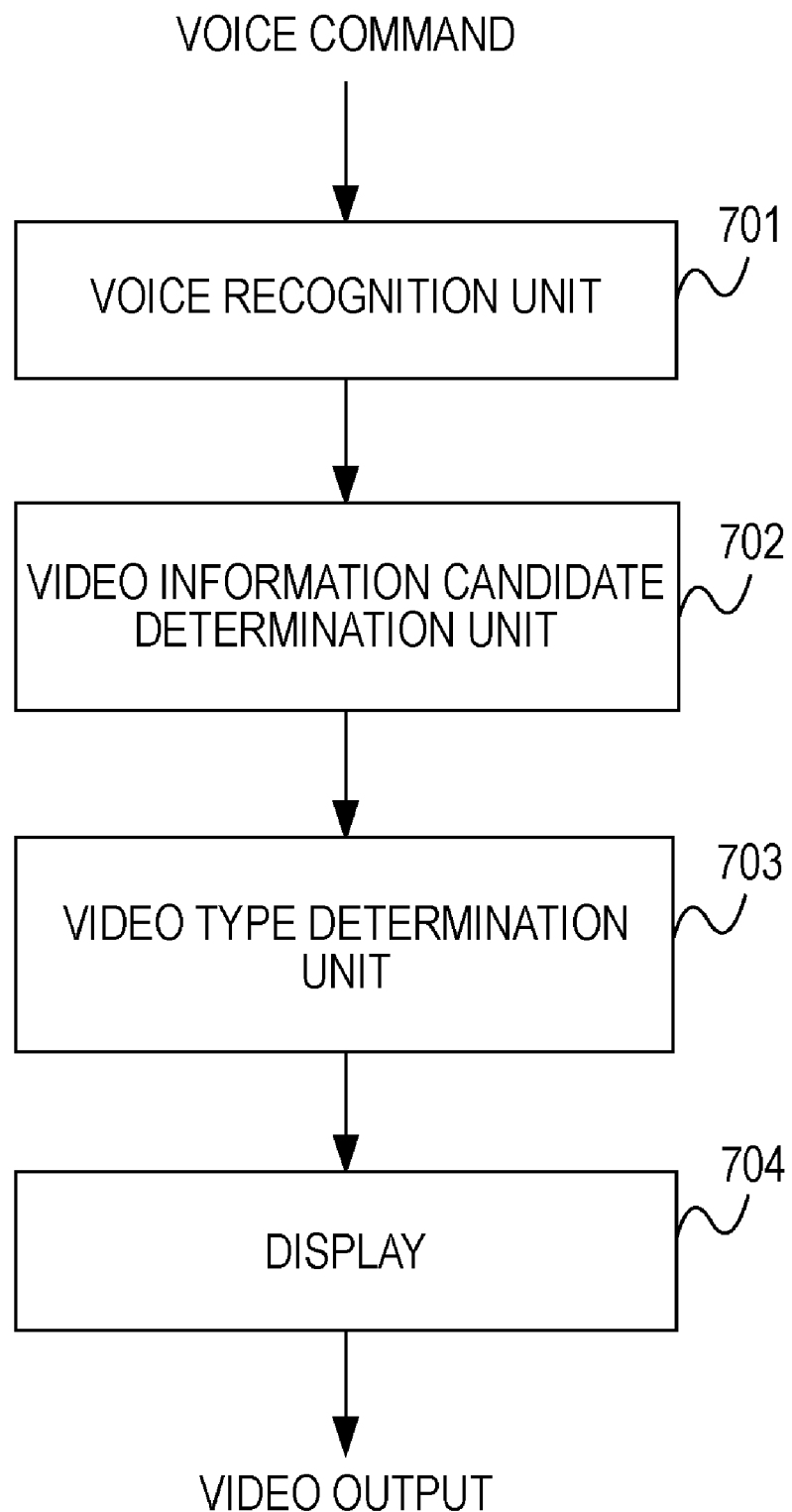
FIG. 7 is a block diagram showing a functional configuration of an information processing apparatus according to an embodiment of the present invention.
Figure 8:
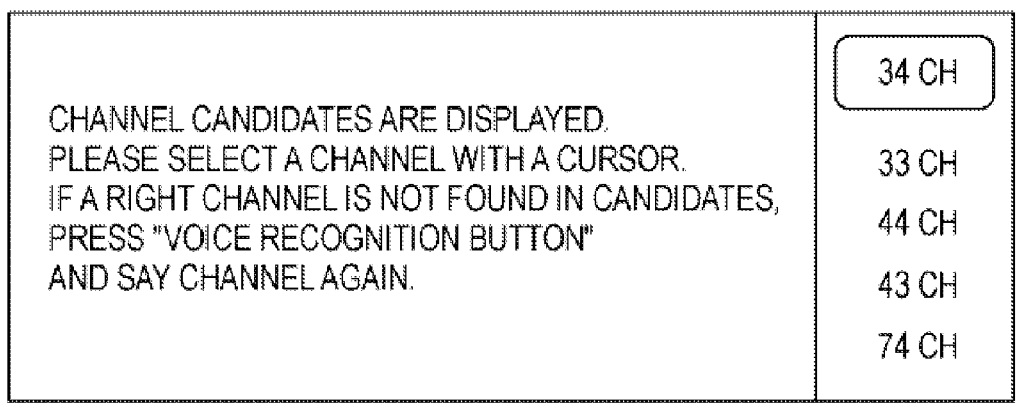
FIG. 8 is a diagram showing a manner in which a user selects a correct channel from a plurality of channels displayed as candidates obtained via voice recognition, according to a conventional technique.

FIG. 7 is a block diagram showing a functional configuration of a video output apparatus according to the present embodiment. As shown in FIG. 7, the video output apparatus includes a voice recognition unit 701 adapted to recognize a voice uttered by a user, a candidate determination unit 702 adapted to determine video information candidates on the basis of a result of voice recognition, a video output mode determination unit 703 adapted to determine a mode in which to output video information, for each video information candidate, and a display 704 adapted to display acquired video information.

The video output mode determination unit 703 selects one video output mode for each video information candidate from a group including a complete video mode in which complete video information including complete frames is output, a frame-skipping mode in which video information obtained at predetermined intervals is output, and a still image mode in which video information obtained at a particular time is output, and the video output mode determination unit 703 assigns the selected video output mode to each video information candidate. The determination of video output mode may be made on the basis of the likelihood scores in voice recognition. The video information candidates are then displayed in subareas on the display 704 in a similar manner as shown in FIG. 3 according to the determined video output modes.

Note that the present invention may also be practiced by providing to a system or an apparatus a storage medium having software program code stored thereon for implementing the functions disclosed in the embodiments described above and by reading and executing the program code on a computer (or a CPU or a MPU) disposed in the system or the apparatus. In this case, the program code read from the storage medium implements the functions disclosed in the embodiments described above, and the storage medium on which the program code is stored falls within the scope of the present invention.

Storage media which can be employed in the present invention to supply the program code include a floppy disk, a hard disk, an optical disk, a magneto-optical disk, a CD-ROM, a CD-R, a magnetic tape, a non-volatile memory card, and a ROM. The program code may be supplied using a computer network such as a LAN (Local Area Network) or a WAN (Wide Area Network).

When the program code is executed on the computer to implement the functions disclosed in the embodiments, part or all of the process may be performed by an operating system or the like running on the computer in accordance with a command issued by the program code. Such implementation of the functions also falls within the scope of the present invention.

To implement one or more functions according to any of the above-described embodiments of the invention, the program stored on a storage medium may be loaded into a memory of an extension card inserted in a computer or into a memory of an extension unit connected to the computer, and part or all of the process may be performed by a CPU disposed on the extension card or the extension unit in accordance with the loaded program code. Note that such implementation of the functions also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-334319 filed Nov. 18, 2005, which is hereby incorporated by reference herein in its entirety.

What is claimed is:

1. An information processing apparatus comprising:
a plurality of receiving units configured to receive program information;
a voice recognition unit configured to recognize input voice data;
an acquisition unit configured to acquire one or more channel candidates in accordance with a result of voice recognition performed by the voice recognition unit;
an assigning unit configured to assign the channel candidates acquired by the acquisition unit to the respective receiving unit,
wherein the assigning unit assigns the channel candidates such that assigned channel candidates are switched at predetermined time intervals, and
wherein the assigning unit assigns the channel candidates such that channel candidates given higher scores in the wherevoice recognition are assigned for longer time periods than those given lower scores; and
a display control unit configured to control displaying so that program information corresponding to the assigned channels received by the respective receiving unit is displayed.

2. The information processing apparatus according to claim 1, wherein the receiving unit is a tuner.

3. The information processing apparatus according to claim 1, wherein the assigning unit assigns the channel candidates in accordance with scores given to the respective channel candidates in the voice recognition performed by the voice recognition unit.

4. The information processing apparatus according to claim 1, wherein the voice recognition unit determines confidence scores in voice recognition, and the acquisition unit determines the number of channel candidates in accordance with the confidence scores.

5. The information processing apparatus according to claim 1, wherein the display control unit divides a display area into subareas depending on the number of channel candidates, and displays program information corresponding to respective channel candidates received by the receiving unit in the respective subareas.

6. The information processing apparatus according to claim 1, wherein the voice data recognized by the voice recognition unit is a word indicating a channel, and the acquisition unit selects a channel corresponding to a word recognized by the voice recognition as a channel candidate.

7. The information processing apparatus according to claim 1, further comprising a related information acquisition unit configured to acquire program related information,
wherein the voice data recognized by the voice recognition unit is a word included in the program related information, and the acquisition unit selects a channel related, in the program related information, to a word recognized by the voice recognition as a channel candidate.

8. An information processing apparatus comprising:
a plurality of receiving units configured to receive program information;
a voice recognition unit configured to recognize input voice data;
an acquisition unit configured to acquire one or more channel candidates in accordance with a result of voice recognition performed by the voice recognition unit;
an assigning unit configured to assign the channel candidates acquired by the acquisition unit to the respective receiving unit,
wherein the assigning unit assigns a channel candidate given a highest score in the voice recognition exclusively to one of the receiving units without switching the channel, while the assigning unit assigns channel candidates given lower scores in the voice recognition to the other respective receiving unit such that the assigned channel candidates are switched at predetermined time intervals; and
a display control unit configured to control displaying so that program information corresponding to the assigned channels received by the respective receiving unit is displayed.

9. An information processing method comprising:
receiving program information at a plurality of receiving units;
recognizing input voice data;
acquiring one or more channel candidates in accordance with a result of voice recognition performed;
assigning the channel candidates acquired to a respective receiving unit of the plurality of receiving units,
wherein the channel candidates are assigned such that assigned channel candidates are switched at predetermined time intervals, and
wherein the channel candidates are assigned such that channel candidates given higher scores in the voice recognition are assigned for longer time periods than those given lower scores; and
controlling a display so that program information corresponding to the assigned channels received are displayed.

10. An information processing method comprising:
receiving program information at a plurality of receiving units;
recognizing input voice data;
acquiring one or more channel candidates in accordance with a result of voice recognition performed;
assigning the channel candidates acquired to a respective receiving unit of the plurality of receiving units,
wherein channel candidate are assigned given a highest score in the voice recognition exclusively to one of the receiving units without switching the channel, while channel candidates are assigned given lower scores in the voice recognition to the other respective receiving unit such that the assigned channel candidates are switched at predetermined time intervals; and
controlling a display so that program information corresponding to the assigned channels received are displayed.

11. A computer-readable storage medium storing a computer-readable process, the computer-readable process causing a computer to execute an information processing method comprising:
receiving program information at a plurality of receiving units;
recognizing input voice data;
acquiring one or more channel candidates in accordance with a result of voice recognition performed;
assigning the channel candidates acquired to a respective receiving unit of the plurality of receiving units,
wherein the channel candidates are assigned such that assigned channel candidates are switched at predetermined time intervals, and
wherein the channel candidates are assigned such that channel candidates given higher scores in the voice recognition are assigned for longer time periods than those given lower scores; and
controlling a display so that program information corresponding to the assigned channels received are displayed.

12. A computer-readable storage medium storing a computer-readable process, the computer-readable process causing a computer to execute an information processing method comprising:
receiving program information at a plurality of receiving units;
recognizing input voice data;
acquiring one or more channel candidates in accordance with a result of voice recognition performed;
assigning the channel candidates acquired to a respective receiving unit of the plurality of receiving units,
wherein channel candidate are assigned given a highest score in the voice recognition exclusively to one of the receiving units without switching the channel, while channel candidates are assigned given lower scores in the voice recognition to the other respective receiving unit such that the assigned channel candidates are switched at predetermined time intervals; and
controlling a display so that program information corresponding to the assigned channels received are displayed.

* * * * *